US010016635B2

(12) United States Patent
Foley et al.

(10) Patent No.: US 10,016,635 B2
(45) Date of Patent: Jul. 10, 2018

(54) PNEUMATICALLY ADJUSTABLE ANCHOR ASSEMBLY

(71) Applicant: FOLEY PATENTS, LLC, Abbeville, LA (US)

(72) Inventors: Lawrence E. Foley, Lafayette, LA (US); Scott C. Foley, Abbeville, LA (US)

( * ) Notice: Subject to any disclaimer, the term of this patent is extended or adjusted under 35 U.S.C. 154(b) by 0 days.

(21) Appl. No.: 15/204,682

(22) Filed: Jul. 7, 2016

(65) Prior Publication Data

US 2017/0007862 A1 Jan. 12, 2017

Related U.S. Application Data

(60) Provisional application No. 62/190,024, filed on Jul. 8, 2015.

(51) Int. Cl.
*F16M 11/00* (2006.01)
*A62B 35/00* (2006.01)

(52) U.S. Cl.
CPC ................................ *A62B 35/0068* (2013.01)

(58) Field of Classification Search
CPC .... F16M 11/24; F16M 11/28; F16M 11/2014; F16M 11/08
USPC ......... 248/125.1, 125.2, 125.3, 125.8, 125.9, 248/122.1, 499
See application file for complete search history.

(56) References Cited

U.S. PATENT DOCUMENTS

| | | | | |
|---|---|---|---|---|
| 3,399,783 A * | 9/1968 | Injeski | A47G 25/0685 211/103 |
| 9,387,351 B2 * | 7/2016 | Auston | A62B 35/0068 |
| 9,611,665 B2 * | 4/2017 | West | E04G 21/3276 |
| 2008/0277557 A1 * | 11/2008 | Vetesnik | A62B 1/04 248/499 |
| 2010/0090071 A1 * | 4/2010 | Gothard | B05B 13/0285 248/129 |
| 2014/0339380 A1 * | 11/2014 | Barrett | F16M 11/28 248/125.8 |

* cited by examiner

*Primary Examiner* — Steven M Marsh
(74) *Attorney, Agent, or Firm* — Ted M. Anthony

(57) ABSTRACT

An adjustable anchor post assembly for use with a personnel fall arrest or protection system. A pneumatically adjustable anchor post assembly for use in providing an elevated attachment point for a personnel fall protection lifeline, such as, for example, when personnel are climbing and/or working on equipment on skids or large equipment. More particularly, a pneumatically adjustable lifeline anchor post assembly, wherein a column post of the present invention can be pneumatically raised or lowered, and selectively locked in a desired position.

7 Claims, 11 Drawing Sheets

SECTION 5-5

DETAIL C

DETAIL D

DETAIL E

PNEUMATICALLY ADJUSTABLE ANCHOR ASSEMBLY

BACKGROUND OF THE INVENTION

Field of the Invention

The present invention pertains to an adjustable anchor assembly for use with a personnel fall arrest or protection system. More particularly, the present invention pertains to an adjustable anchor post assembly for use in providing an elevated attachment point for a personnel fall protection lifeline, such as, for example, when personnel are climbing and/or working on skids or large equipment. More particularly still, the present invention pertains to a pneumatically adjustable lifeline anchor post assembly, wherein a column post of the present invention can be pneumatically raised or lowered, and selectively locked in a desired position.

Brief Description of the Prior Art

In certain industrial settings (such as, for example, the oil and gas industry), it is common to have various types of equipment mounted within a supporting or transportation skid, basket or other structure. During operation and/or maintenance of said equipment, it is often necessary for personnel to climb to an upper surface of said skid(s)/structure(s) and/or equipment contained therein.

Governmental safety laws and/or regulations generally require that when personnel are working more than a predetermined distance above a ground or floor surface (such as, for example, on a skid, basket or other similar structure), said personnel must be protected against inadvertent falling. One such protection means comprises a personnel fall arrest or fall protection system.

Although specific embodiments can vary, such fall arrest systems generally comprise a harness that can be worn by a user and a safety line (lifeline) having a first end and a second end; said first end is attached to said harness, and said second end is attached or anchored to a fixed support, typically positioned at an elevated position above said user. In the event of a fall, the distance that said user can travel, along with the rate of deceleration, can be relatively controlled in order to prevent significant injury or death. Typically, the second end of said lifeline must be anchored to a fixed support above a point of attachment of said first end of said lifeline to said harness, preferably above the user's head.

When such fall arrest lifelines are used within a fixed structure, the second end of said lifeline may be attached to any number of different parts of the structure that are generally located above a user. When personnel are required to climb on a relatively small or portable structure, a vertically extendable anchor assembly is generally required to provide an attachment point for said lifeline. In most cases, such conventional anchor assemblies are designed for a specific structure and, thus, are permanently attached to said structure. One method of extending such conventional anchor systems involves employing a crane, while another method requires personnel to mechanically lift or pivot the anchor means into position.

However, if an anchor system is not permanently attached to a skid or other structure, personnel often anchor or "tie off" the lifeline to a top end of said skid or other structure, below the point of attachment of the lifeline to the harness; this method generally does not comply with applicable laws and/or regulations and often can present more danger to a user than if no lifeline were used at all.

Thus, there is a need for a personnel fall arrest or fall protection assembly that can be efficiently and effectively used to protect personnel when climbing on a skid, basket or other similar structure. The fall protection assembly should beneficially include an extendable anchor post that can be attached to existing skids, baskets or other structures. Further, said extendable anchor post should have a selectively adjustable length that can be easily extended or retracted.

SUMMARY OF THE INVENTION

The present invention comprises a personnel fall arrest and/or fall protection assembly that can be efficiently and effectively used to protect personnel from injury or death when climbing on a skid, basket or other similar structure (and/or cargo or other objects contained therein).

Said personnel fall protection assembly of the present invention comprises a lifeline anchor assembly that can be operationally attached to a corner post of a skid, basket or other structure. Said lifeline anchor assembly can be quickly and easily attached to a conventional skid, basket or other structure, and thereafter removed, thereby permitting use with a variety of existing skids, baskets or other structures having different shapes and sizes. The lifeline anchor assembly of the present invention need not be specifically designed for use with a particular size or type of skid, basket or other structure, and need not be permanently attached thereto.

In a preferred embodiment, said pneumatic lifeline anchor assembly of the present invention beneficially includes an extendable anchor post that can be attached to existing skids, baskets or other structures. Said extendable anchor post further comprises a base member, a fixed pipe column, a moveable pipe column and an extendable jib member. Said extendable anchor post has a selectively adjustable length that can be easily extended or retracted using pneumatic power.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

The pneumatic lifeline anchor assembly 100 of the present invention can be utilized in connection with many different structures without departing from the scope of the present invention. For ease of reference, the lifeline anchor assembly 100 of the present invention is described below primarily as being used in connection with a skid 10. However, it is to be observed that said lifeline anchor assembly 100 can also be used in connection with baskets or other structures, and the references to skids herein are not intended to be, and should not be, construed as limiting in any way.

Figure 1:
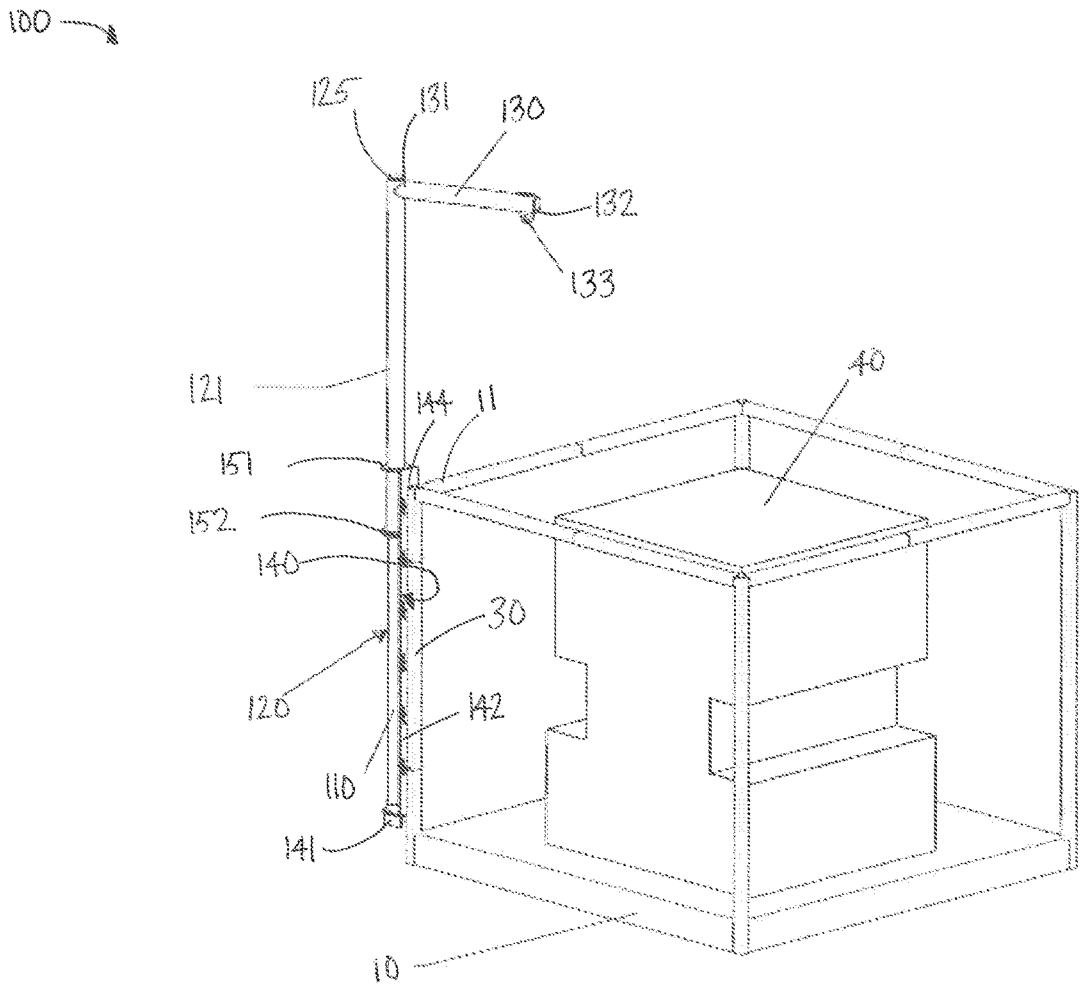
FIG. 1 depicts a side perspective view of a preferred embodiment of a pneumatic lifeline anchor assembly of the present invention attachably connected to a skid.

Referring to the drawings, FIG. 1 depicts a perspective view of a preferred embodiment of a pneumatic lifeline anchor assembly 100 of the present invention comprising an extendable support member 120 that can be attachably connected to a skid 10, or any other similar structural member having a cargo area 40. Extendable support member 120 generally comprises a mounting assembly 140, a fixed inner column member 110, and an extendable outer column member 121. Mounting assembly 140 comprises a bracket member further comprising a substantially vertical planar plate member 142 and a substantially horizontal planar base plate member 141, wherein horizontal plate member 141 is disposed at a bottom end 143 of vertical plate member 142. Vertical base plate 142 is adapted to be removably attached and securely clamped to skid corner post 30, such that a top end 144 of mounting assembly 140 is located at a position near a top end 11 of skid 10.

Still referring to FIG. 1, extendable support member 120 comprises a substantially vertical outer column member 121 that is coaxially disposed about fixed inner column member 110, such that outer column member 121 may be adapted to slidably extend and retract about fixed inner column member 110, as necessary. As a result, outer column member 121 comprises a substantially cylindrical shaped member having a relatively larger diameter than inner column member 110. Extendable support member 120 further comprises a substantially horizontal jib boom member 130, wherein a proximal end 131 of jib boom 130 is attachably connected to a top end 125 of outer column member 121, and a distal end 132 of jib boom 130 comprises a padeye 133, or any other similar mounting bracket, thereby allowing for an attachment and connection point in order for a lifeline to be attached. Further, jib boom member 130 is adapted to at least partially extend over skid 10.

In a preferred embodiment, when in an extended position, horizontal jib boom 130 of outer column 121 can be located approximately several feet above top end 11 of skid 10, while when in a retracted position (although not illustrated in FIG. 1), horizontal jib boom 130 can be located immediately above top end 11 of skid 10. Additionally, outer column 121 can be adapted to alternate between a first retracted position and a second extended position about fixed inner column 110, wherein a mechanical stop prevents extendable support member 120 from lowering when outer column member 121 is in an extended position above skid 10.

Further, in a preferred embodiment, vertical base plate 142 comprises a plurality of horizontal support plates 150 for use in preventing lateral movement and rotation of outer column 121, while allowing outer column 121 to slide vertically through horizontal support plates 145 as outer column 121 is extended and retracted. Upper support plate 151 is disposed at a top end 144 of vertical base plate 142, wherein lower support plate 152 is disposed substantially below upper support plate 151. When outer column 121 is fully raised and extended, a bottom end 126 of outer column 121 is located immediately below lower support plate 152. As such, upper 151 and lower support plates 152 restrain outer column 121 against an applied movement as a vertical load is applied to padeye 133 on horizontal jib boom 130. Thus, any movement from a downward force that is applied to padeye 133 at an end 132 of jib boom 130 is restrained over a significant length of skid corner post 30.

Additionally, although not depicted in FIG. 1, horizontal base plate 141 comprises an aperture 170 that is relatively concentric with an inner axis of inner column 110. Aperture 170 is tapped, such that a variety of different pipe fittings may be attached to aperture 170 below inner column 110.

Figure 2:
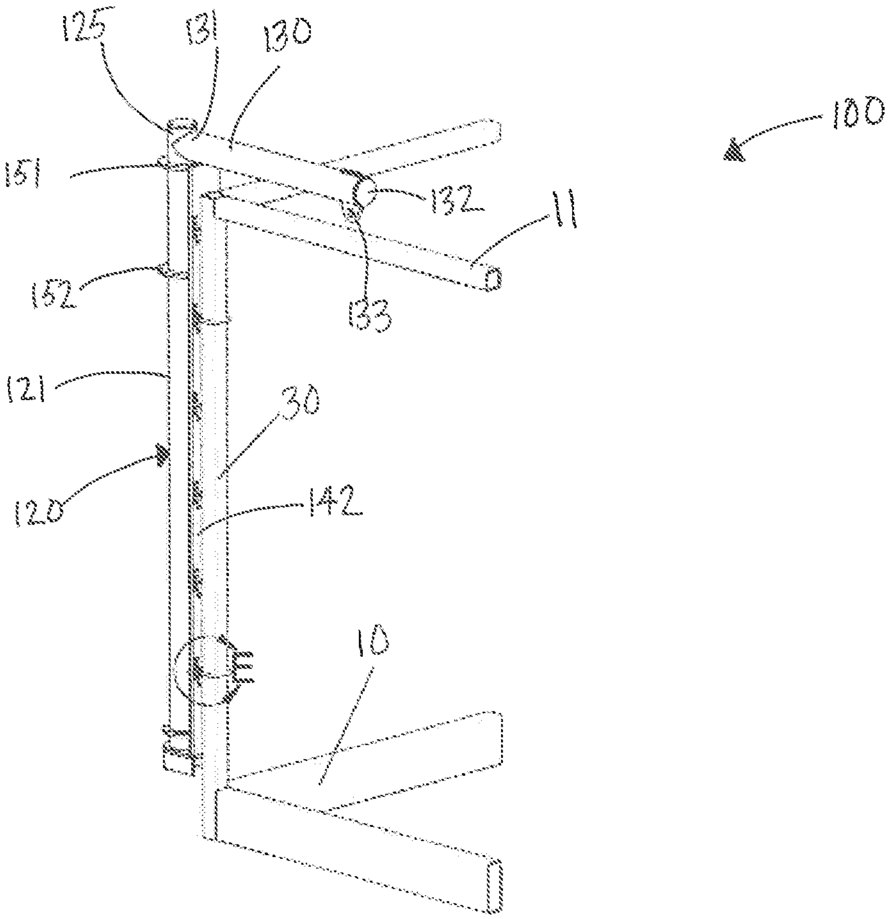
FIG. 2 depicts a side perspective view of a preferred embodiment of a pneumatic lifeline anchor assembly of the present invention in a retracted position.

FIG. 2 depicts a perspective view of pneumatic lifeline anchor assembly 100 generally comprising extendable support member 120 with mounting assembly 140, fixed inner column 110, and outer column member 121. Extendable support member 120 comprises substantially vertical outer pipe column 121 that is coaxially disposed about fixed inner column 110, such that outer column 121 may be slidably extended and retracted about inner column 110, as necessary. Extendable support member 120 further comprises substantially horizontal jib boom 30, wherein proximal end 131 of jib boom 130 is attachably connected to top end 125 of outer pipe column 121, and distal end 132 of jib boom 130 comprises padeye 133, thereby allowing for a connection point in order for a lifeline to be attached.

Still referring to FIG. 2, in a preferred embodiment, outer pipe 121 is retracted about fixed inner column 110, whereby vertical base plate 142 comprises horizontal support plates 150, which prevent lateral movement or rotation of outer column 121, while beneficially allowing outer column 121 to slide vertically through horizontal support plates 150 as outer column 121 is extended and retracted. Thus, when in a retracted position, horizontal jib boom 130 can be located immediately above top end 11 of skid 10.

Figure 3:
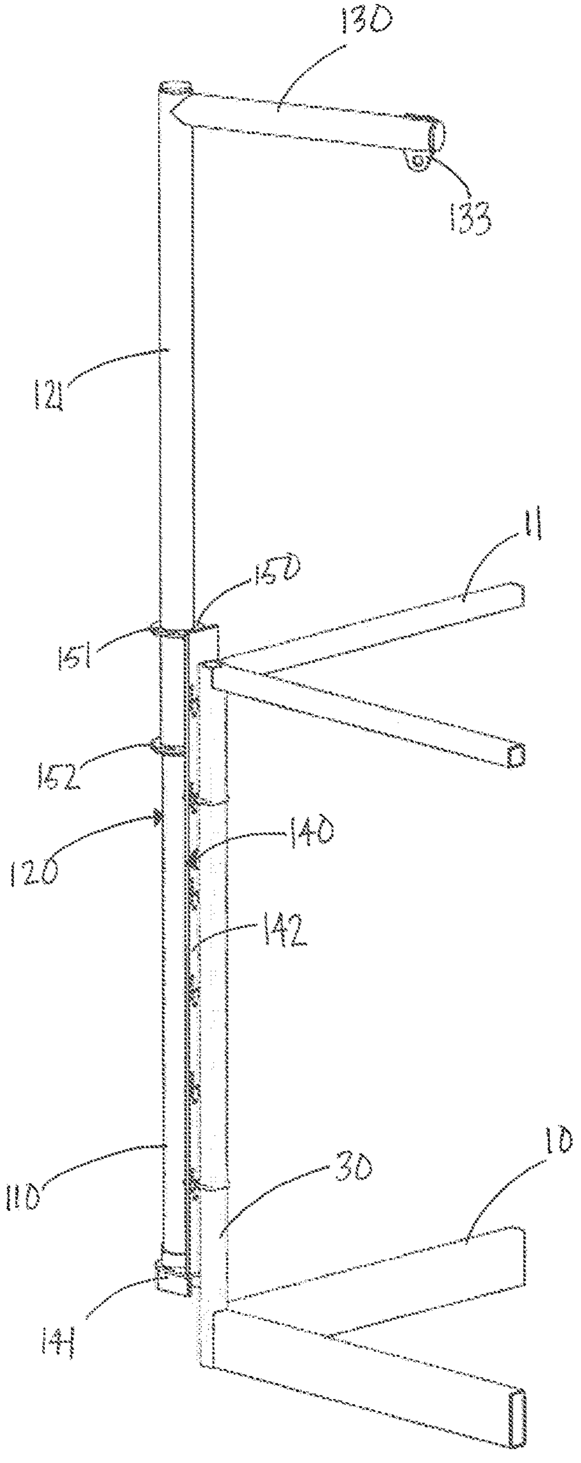
FIG. 3 depicts a side perspective view of a preferred embodiment of a pneumatic lifeline anchor assembly of the present invention in an extended position.

FIG. 3 depicts a perspective view of pneumatic lifeline anchor assembly 100 of the present invention comprising mounting assembly 140 with vertical base plate 142 and horizontal support plates 150, inner column member 110, and outer column member 121 with jib boom member 130. In a preferred embodiment, when in an extended position, as depicted in FIG. 3, jib boom 130 of outer column 121 can be located approximately several feet above top end 11 of skid 10. Additionally, outer column member 121 is rotatable about its longitudinal axis and is slidably extended about fixed inner column 110, wherein a mechanical stop prevents extendable support member 120 from lowering when outer column member 121 is in an extended position above skid 10.

Figure 4:
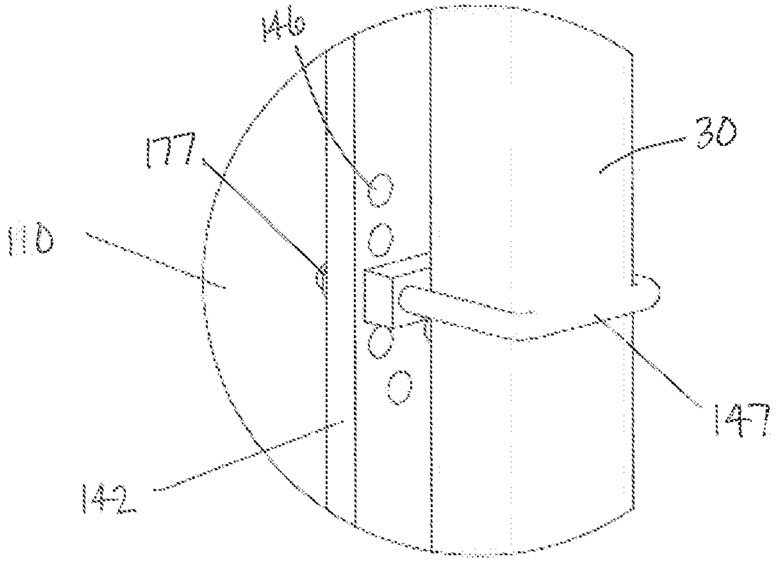
FIG. 4 depicts an enhanced view of a preferred embodiment of a clamp and a base plate of a pneumatic lifeline anchor assembly of the present invention.

FIG. 4 depicts an enhanced view of a clamp member 147 and base plate 142 of pneumatic lifeline anchor assembly 100 of the present invention. Anchor assembly 100 comprises mounting assembly 140, generally comprising vertical base plate 142 member and horizontal base plate member 141. Vertical base plate member 142 comprises a plurality of apertures 146, wherein apertures 146 can be used to securely adjoin vertical base plate member 142 to skid corner post 30 via clamp member 147 and a plurality of fasteners 177, or any other secure attachment means, thereby aligning top end 144 of mounting assembly 140 with top end 11 of skid 10.

Figure 5:
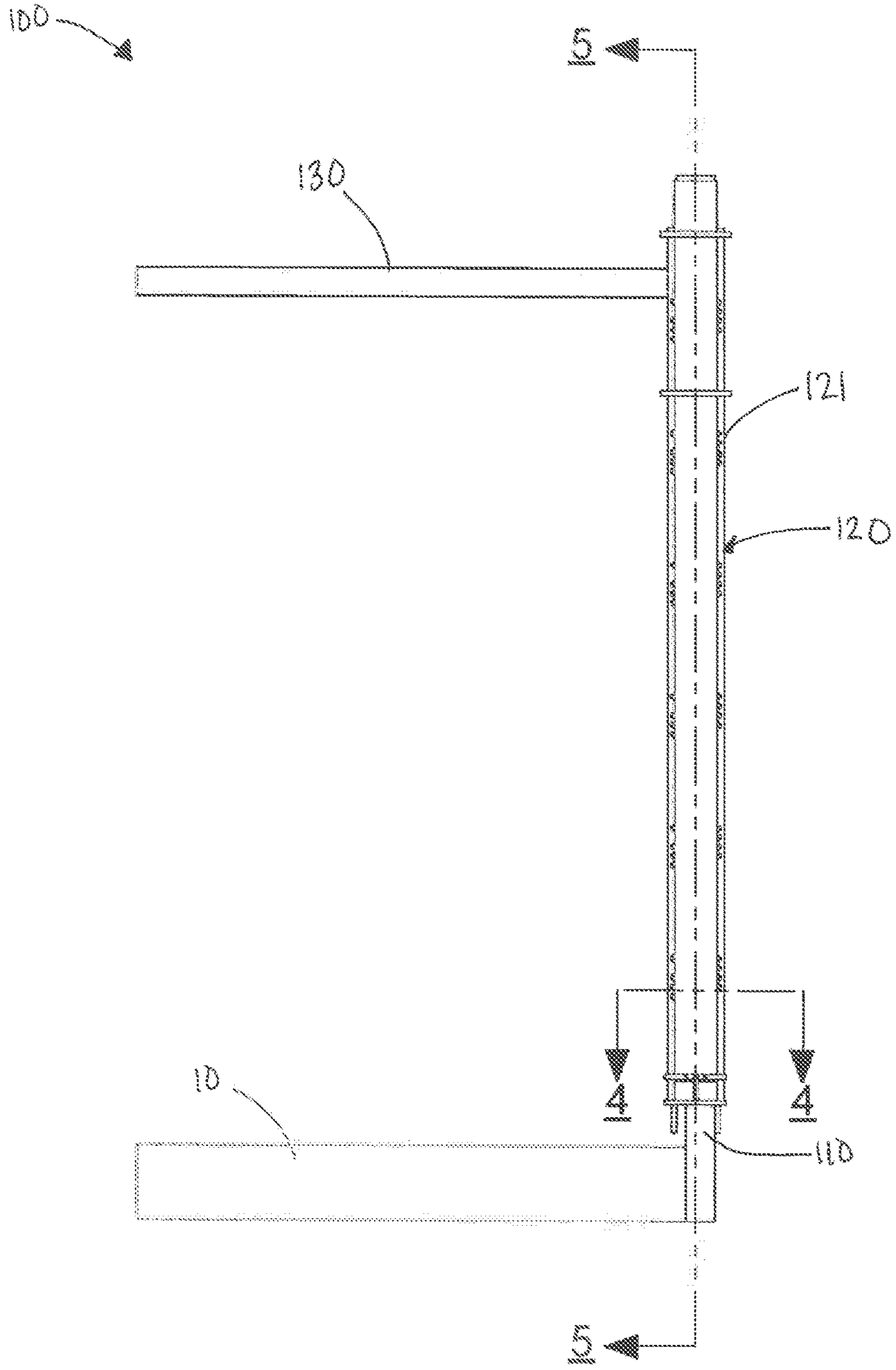
FIG. 5 depicts a side view of a preferred embodiment of a pneumatic lifeline anchor assembly of the present invention.
Figure 6:
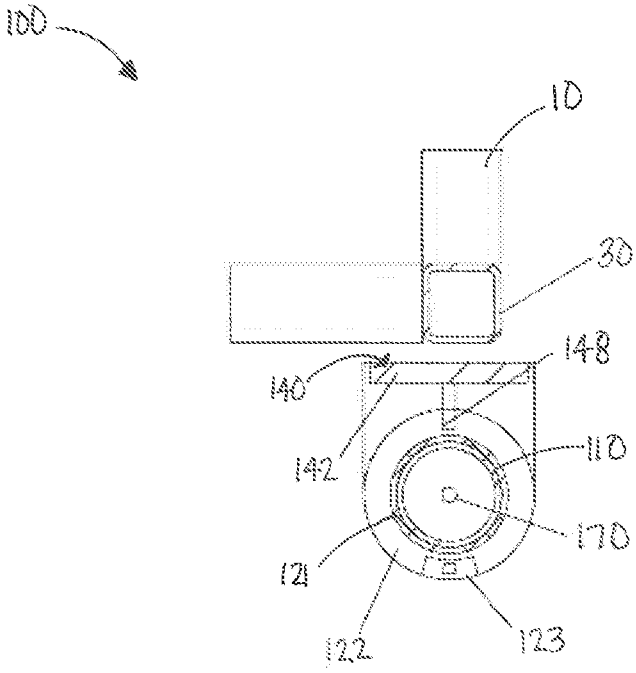
FIG. 6 depicts an aerial view of a preferred embodiment of a pneumatic lifeline anchor assembly of the present invention wherein a flange is positioned below a vertical rigid member.

FIG. 5 depicts a side view of pneumatic lifeline anchor assembly 100 generally comprising extendable support member 120 attachably connected to skid 10, wherein extendable support member 120 further comprises inner column member 110, outer column member 121, and jib boom member 130. FIG. 6 depicts an aerial view of pneumatic lifeline anchor assembly 100 of the present invention generally comprising mounting assembly 140, outer column 121, and inner column 110, wherein mounting assembly 140 comprises vertical base plate 142 attachably connected to skid corner post 30. Additionally, mounting assembly 140 comprises a substantially planar rigid vertical member 148 that is located in a relatively perpendicular orientation to vertical base plate 142 and extending along at least a portion of a length of said base plate 142, thus being disposed between base plate 142 and outer pipe column 121. A top end 181 of vertical member 148 can be located at a relatively short distance below lower horizontal support plate 152, and a bottom end 182 of vertical member 148 can be located at a relatively short distance above horizontal base plate 141.

As depicted in FIG. 6, in a preferred embodiment, horizontal base plate 141 comprises aperture 170 that is relatively concentric with an inner axis of inner column 110. Aperture 170 is tapped, such that a variety of different pipe fittings may be attached to aperture 170 below fixed inner column 110. Additionally, although not illustrated in FIG. 6, inner pipe column 110 comprises a relatively horizontal cap that is located at top end 111 of inner pipe column 110. Horizontal cap comprises a bore, or through-hole, that is coaxially aligned with inner axis of inner column 110.

Figure 7:
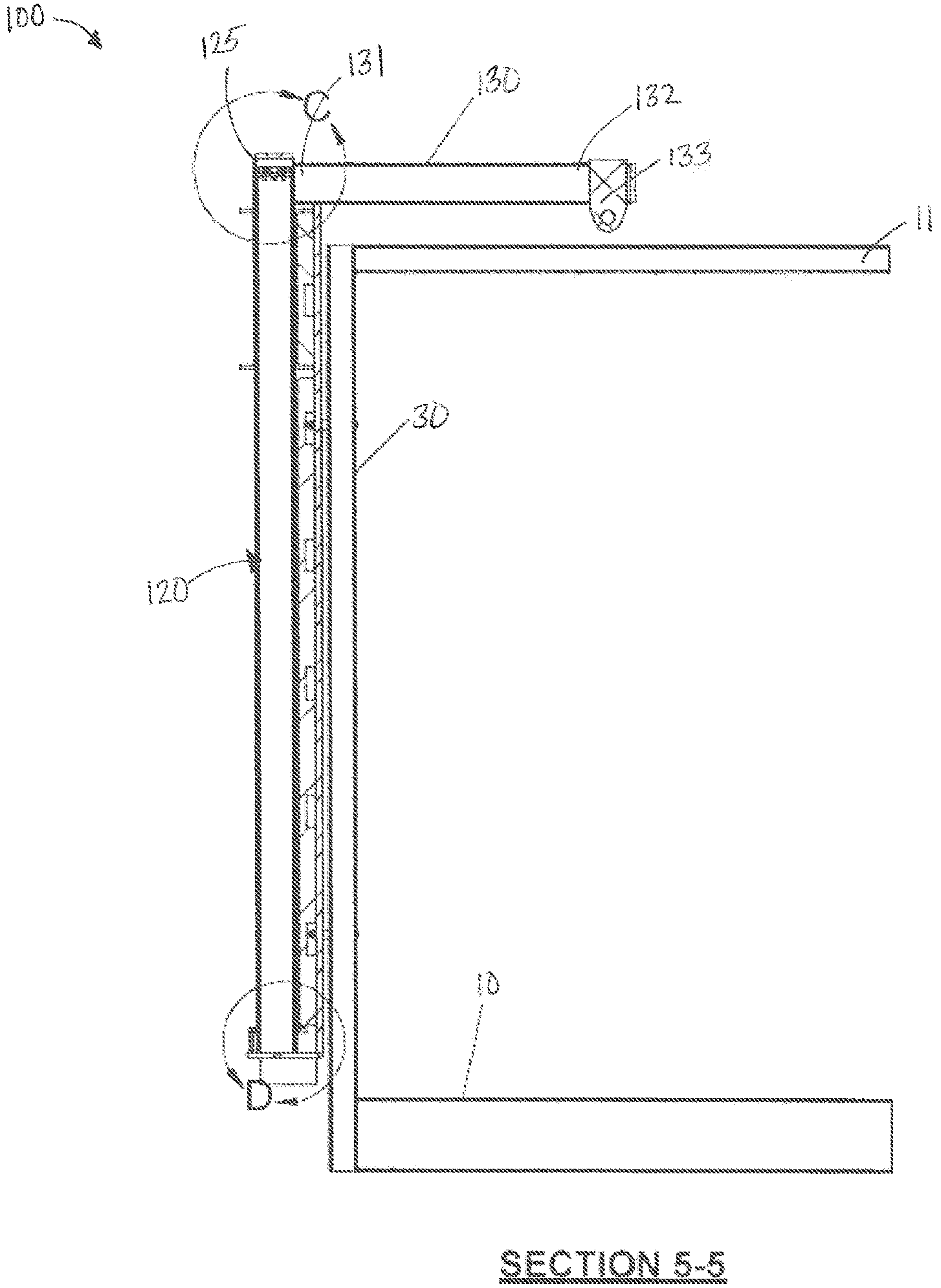
FIG. 7 depicts a side view of a preferred embodiment of a pneumatic lifeline anchor assembly of the present invention.

FIG. 7 depicts a side view of pneumatic lifeline anchor assembly 100 generally comprising extendable support member 120 attachably connected to skid 10, wherein extendable support member 120 further comprises inner column member 110, outer column member 121, and jib boom member 130. Jib boom member 130 extends in a relatively perpendicularly outward direction from top end 125 of outer column 121 having padeye 133 located on an end 132 of jib boom member 130 that is opposite from an end 131 of jib boom member 130 that connectably attaches to outer pipe column 121. Additionally, an outer diameter of inner column 110 is substantially similar to an inner diameter of outer column 121, thereby allowing inner column 110 to be received within outer column 121 and outer column member 121 to be rotatable about its longitudinal axis as outer column 121 is extended and retracted during operation.

Figure 8:
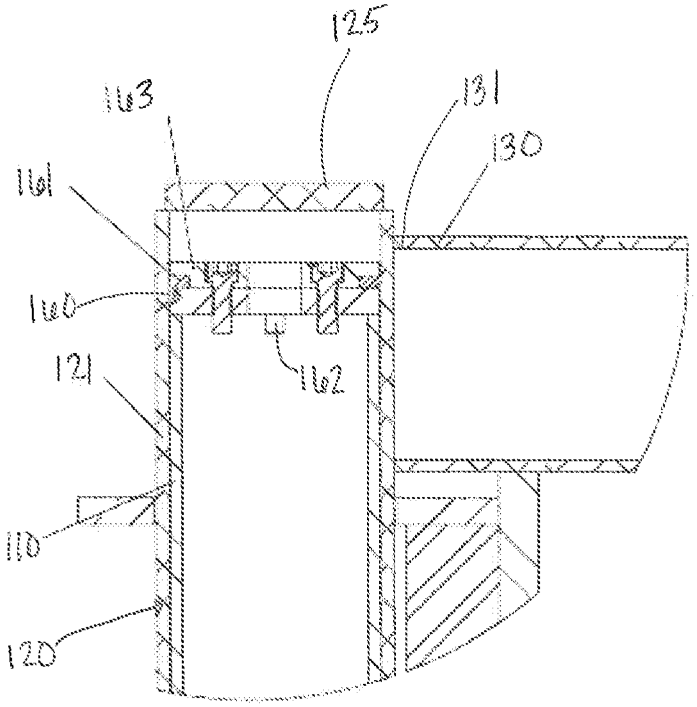
FIG. 8 depicts an enhanced view of a preferred embodiment of a seal assembly of an extendable support member of a pneumatic lifeline anchor assembly of the present invention.

FIG. 8 depicts an enhanced view of a seal assembly 160 of extendable support member 120 of pneumatic lifeline anchor assembly 100 of the present invention. Anchor assembly 100 of the present invention comprises jib boom 130 that is attachably connected to outer pipe column 121, wherein jib boom 130 extends in a relatively perpendicularly outward direction from top end 125 of outer column member 121. Additionally, as illustrated in FIG. 8, outer diameter of fixed inner column 110 is substantially similar to inner diameter of outer column 121, thereby allowing fixed inner column 110 to be received within outer column 121 as outer column 121 is extended and retracted during operation.

As depicted in FIG. 8, inner column 110 comprises a relatively horizontal cap that is located at top end 111 of inner column 110. Horizontal cap comprises a bore, or through-hole, that is coaxially aligned with inner axis of fixed inner pipe column. Seal assembly 160 comprises a fluid pressure seal 161 and a seal retainer 163 that are beneficially disposed between inner column member 110 and outer column member 121, generally located above horizontal cap, whereby an outer diameter of fluid pressure seal 161 engages an inner diameter of outer column 121. Seal assembly 160 further comprises an inner bore 162, or fluid air outlet, that is coaxially aligned with bore of horizontal cap.

Figure 9:
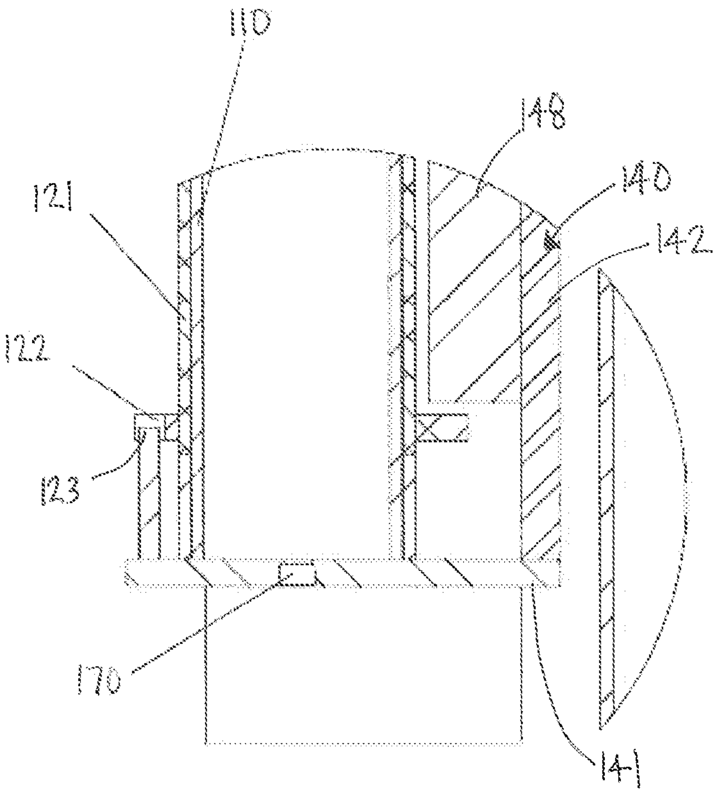
FIG. 9 depicts an enhanced view of a preferred embodiment of a flange member and an air inlet of a pneumatic lifeline anchor assembly of the present invention.

FIG. 9 depicts an enhanced view of a flange member 122 and a fluid inlet 170 of pneumatic lifeline anchor assembly 100 of the present invention. In a preferred embodiment, outer column member 121 comprises a radially extending outer flange member 122 that is disposed over an outer surface of outer column member 121. Additionally, outer flange member 122 is generally disposed at bottom end 126 of outer pipe column 121, wherein flange member 122 is positioned in a relatively perpendicular orientation to outer pipe column 121.

Still referring to FIG. 9, flange 122 comprises a gap 123 that is positioned throughout an entire thickness of flange 122, thus being oriented in a relatively perpendicular alignment to flange member 122 along a portion of a circumference of flange member 122. Further, when extendable support member 120 is fully extended, gap 123 is axially aligned with, but diametrically opposite, jib boom 130. As a result, gap 123 within flange 122 is located in an opposite position from vertical rigid member 148 when anchor assembly 100 is in use, such as, for example, when jib boom member 130 is fully extended and positioned and over skid 10, thus creating a mechanical stop to prevent extendable support member 120 from retracting when in use. Alternatively, when extendable support member 120 is being retracted, gap 123 within flange member 122, beneficially having a width that is relatively larger than a thickness of vertical member 148, is axially aligned with vertical member 148, thereby allowing gap 123 to slidably retract along vertical member 148, and therefore, retract extendable support member 120.

Additionally, as depicted in FIG. 9, horizontal base plate 141 comprises fluid air inlet 170 that is coaxially aligned with inner axis of fixed inner pipe column 110. As such, pressurized air can be introduced through air inlet 170 of horizontal base plate 141, thus allowing extendable support member 120 to be extended using pneumatic power. Although not depicted in FIG. 9, the pressurized air is then able to flow through inner pipe column 110, through a center hole in cap, and through a center air outlet 162 of seal assembly 160, thereby applying pressure to an inner top surface of outer pipe column 121, while seal of inner pipe column 110 prevents air from leaking through an annulus between inner column 110 and outer column 121. Ultimately, the increase of air pressure causes extendable support member 120 to extend in a relatively upward direction.

Figure 10:
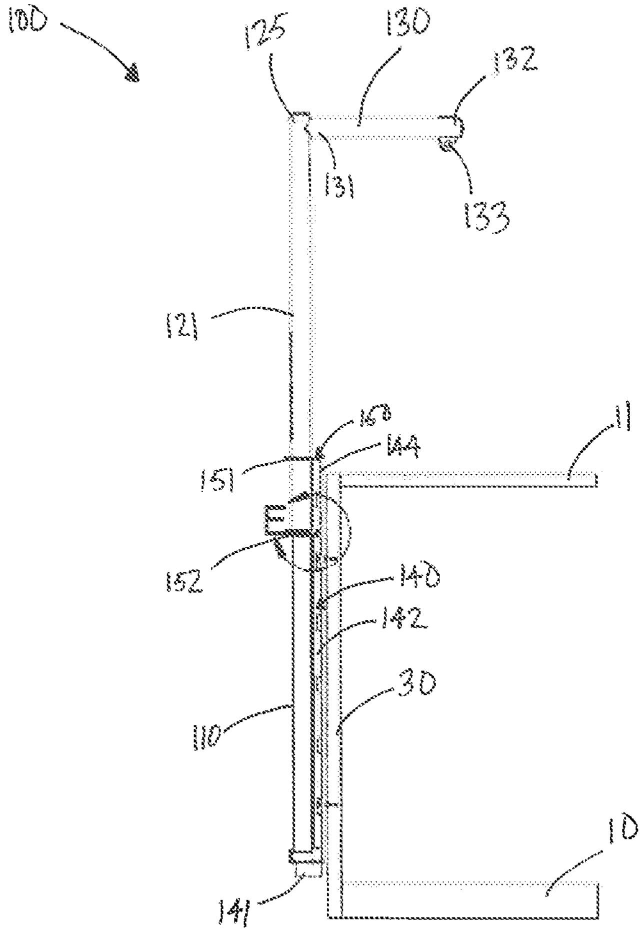
FIG. 10 depicts a side view of a preferred embodiment of a pneumatic lifeline anchor assembly of the present invention with an extendable support member in an extended position.

FIG. 10 depicts a side view of pneumatic lifeline anchor assembly 100 of the present invention comprising vertical base plate 142 and horizontal support plates 150. Vertical base plate 142 comprises horizontal support plates 150 for use in preventing lateral movement or rotation of outer column 121, while allowing outer column 121 to slide vertically through horizontal support plates 150 as outer column 121 is extended and retracted. Upper support plate 151 is disposed at a top end 144 of vertical base plate 142, wherein lower support plate 152 is disposed substantially below upper support plate 151. When outer column 121 is fully extended, as illustrated in FIG. 10, bottom end 126 of outer column 121 is located immediately below lower support plate 152. As such, upper 151 and lower support plates 152 restrain outer column 121 against an applied movement as a vertical load is applied to padeye 133 on jib boom member 130. Thus, any movement from a downward force that is applied to padeye 133 at an end 132 of jib boom member 130 is restrained over a significant length of skid corner post 30.

Figure 11:
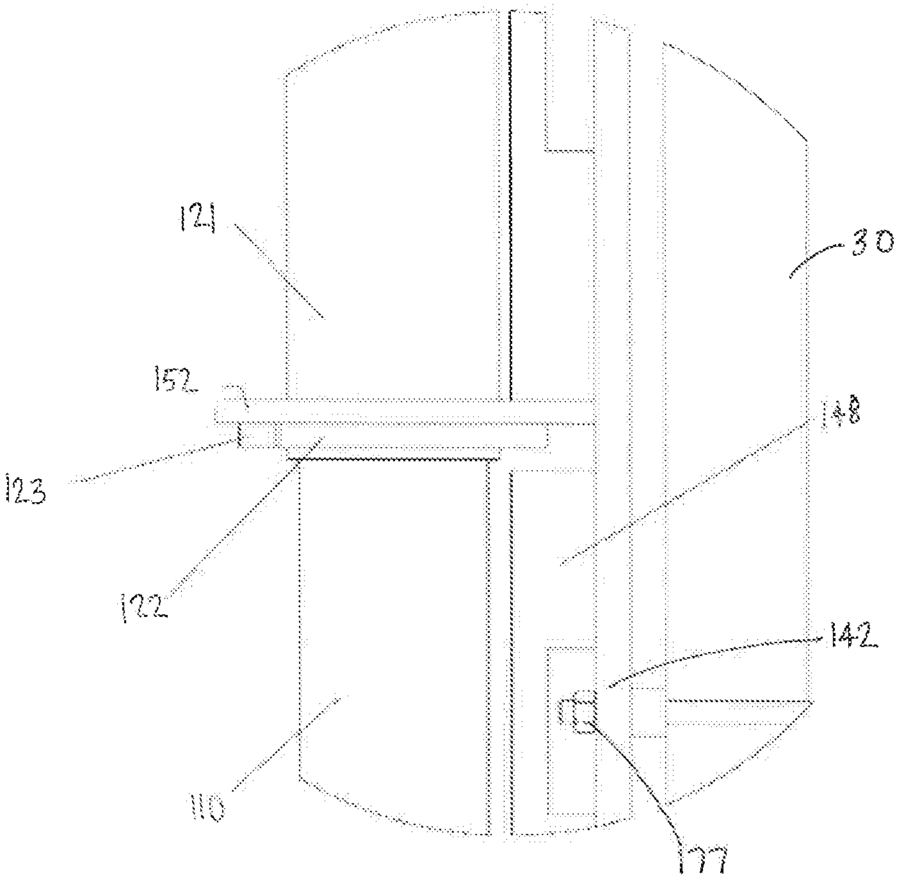
FIG. 11 depicts an enhanced view of a preferred embodiment of a flange of an outer column member of a pneumatic lifeline anchor assembly of the present invention wherein a flange member is positioned above a vertical rigid member.

FIG. 11 depicts an enhanced view of flange member 122 of outer column 121 of pneumatic lifeline anchor assembly 100 of the present invention wherein flange member 122 is positioned above vertical member 148. Pneumatic lifeline anchor assembly 100 of the present invention comprises outer 121 column having outer flange 122 that is located at bottom end 126 of outer column 121, wherein flange 122 is positioned in a relatively perpendicular orientation to outer column 121.

Still referring to FIG. 11, flange 122 comprises a gap 123 that is positioned throughout an entire thickness of flange 122, thus being oriented in a relatively perpendicular alignment to flange member 122 along a portion of a circumference of flange member 122. Further, when extendable support member 120 is fully extended, gap 123 is axially aligned with, but diametrically opposite, jib boom 130. As a result, gap 123 within flange 122 is located in an opposite position from vertical rigid member 148 when anchor assembly 100 is in use, such as, for example, when jib boom member 130 is fully extended and positioned and over skid 10, thus creating a mechanical stop to prevent extendable support member 120 from retracting when in use.

Alternatively, when extendable support member 120 is being retracted, gap 123 within flange member 122, beneficially having a width that is relatively larger than a thickness of vertical member 148, is axially aligned with vertical member 148, thereby allowing gap 123 to slidably retract along vertical member 148, and therefore, retract extendable support member 120.

Still referring to FIG. 11, vertical base plate 142 comprises rigid vertical member 148 that is located in a relatively perpendicular orientation to vertical base plate 142, thus extending along a portion of a length of base plate 142 and being disposed between base plate 142 and outer column 121. As illustrated in FIG. 11, top end 181 of vertical member 148 can be disposed at a relatively short distance below lower horizontal support plate 152, and a bottom end 182 of vertical member 148 can be disposed at a relatively short distance above horizontal base plate 141.

In operation, outer column 121 of extendable support member 120 rotates about a longitudinal axis of fixed inner column 110. When anchor assembly 100 is in use and extendable support member 120 is fully extended, jib boom member 130 is disposed over a cargo area 40 of skid 10, and gap 123 in flange 122 of outer column 121 is disposed opposite vertical rigid member 148 of vertical base plate 142. Alternatively, when jib boom member 130 is rotated away from skid 10, gap 123 in flange 122 of outer column 121 is beneficially aligned with vertical rigid member 148, thereby allowing rigid member 148 to be received within gap 123 of flange 122, and thus, extendable support member 120 is able to extend or retract in a substantially vertical direction, while outer column 121 is simultaneously locked against rotation.

When jib boom 130 is rotated above cargo area 40 of skid 10, gap 123 of flange 122 is located in an opposite position from vertical member 148, and flange 122 of outer pipe column 121 interferes with top surface of vertical member 148, thus creating a mechanical stop and preventing extendable support member 120 from being retracted, typically in the event of loss of air pressure or if a relatively downward vertical load exceeds an upward force of air pressure. Therefore, flange 122 of outer column 121 acts as a mechanical safety stop in order to retain extendable support member 120 in an extended positioned, and thus, to prevent extendable support member 120 from unintentionally lowering if pressure is lost or if an applied force overcomes a force of air pressure that is holding and locking extendable support member 120 in an extended position. As a result, if pressure is lost with extendable support member 120 in an extended position, flange 122 would contact top end 181 of vertical member 148, thereby preventing further lowering of extendable support member 120.

Further, in a preferred embodiment, pressurized air can be introduced through horizontal base plate 141 by way of fluid air inlet 170. Pressurized air then flows through inner column 110, through centralized aperture in cap, and through centralized bore of fluid pressure seal 161, thereby applying pressure to inner top surface of outer column 121, while seal of inner column 110 prevents air from leaking through an annulus between inner column 110 and outer column 121. As a result, an increase in air pressure causes extendable support member 120 to extend and retract in a relatively vertical direction.

In order to intentionally lower extendable support member 120, jib boom member 130 is outwardly rotated opposite cargo area 40 of skid 10, such that gap 123 in flange 122 properly aligns with vertical member 148, thereby allowing gap 123 to slidably lower along length of vertical member 148. Thus, releasing air pressure allows extendable support member 120 to retract until flange 122 contacts a stopper at bottom base plate 141. Jib boom member 130 is then rotated in a relatively parallel position to skid 10, such that gap 123 in flange 122 properly aligns with stop of bottom base plate 141. Moreover, when lowered further to a fully retracted position, stop of bottom base plate 141 prevents extendable support member 120 from rotating during transportation.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A lifeline anchor assembly for a personnel fall protection apparatus comprising:

a) an extendable support member comprising:

(i) at least one bracket member adapted to removably attach to a structural member of a container having a cargo area;

(ii) a base plate having a length attached to said at least one bracket member;

(iii) a rigid member extending along at least a portion of said length of said base plate;

(iv) an inner column member;

(v) an outer column member slidably disposed over said inner column member, wherein said outer column member is adapted to selectively alternate between a first retracted position and a second extended position;

(vi) at least one radially extending flange disposed over the outer surface of said outer column member, wherein said at least one radially extending flange has a gap along a portion of its circumference;

b) a jib member attached to said extendable support member and adapted to at least partially extend over said cargo area; and c) a mounting bracket disposed on said jib member and adapted to operationally attach to a proximate end of a personnel lifeline.

2. The lifeline anchor assembly of claim 1, wherein said extendable support can be extended using pneumatic power.

3. The lifeline anchor assembly of claim 2, wherein said inner column member further comprises an upper end, a lower end, a fluid inlet at said lower end and fluid outlet at said upper end.

4. The lifeline anchor assembly of claim 3, further comprising a fluid pressure seal disposed between said inner column member and said outer column member.

5. The lifeline anchor assembly of claim 1, wherein said extendable outer column member is adapted to be selectively locked in said second extended position.

6. The lifeline anchor assembly of claim 1, wherein said outer column member is rotatable about its longitudinal axis.

7. The lifeline anchor assembly of claim 6, wherein said outer column is locked against rotation when said rigid member is received within said gap of said flange.

* * * * *